May 1, 1934.　　　　　J. R. McWANE　　　　　1,956,692

PIPE JOINT AND PACKING RING THEREFOR

Filed Nov. 28, 1930

INVENTOR
J. R. McWane

BY
Siggers & Adams
ATTORNEYS

Patented May 1, 1934

1,956,692

UNITED STATES PATENT OFFICE 1,956,692

PIPE JOINT AND PACKING RING THEREFOR

James R. McWane, Birmingham, Ala., assignor to McWane Cast Iron Pipe Company, Birmingham, Ala., a corporation of Alabama Application November 28, 1930, Serial No. 498,824

3 Claims. (Cl. 285—115)

This invention relates to pipe joints, and among other objects, aims to provide a serviceable and economical joint which can be prepared and calked in the field and which may be used to repair leaky joints in pipe lines.

In the accompanying drawing showing a preferred embodiment of the invention,—

Figure 1:
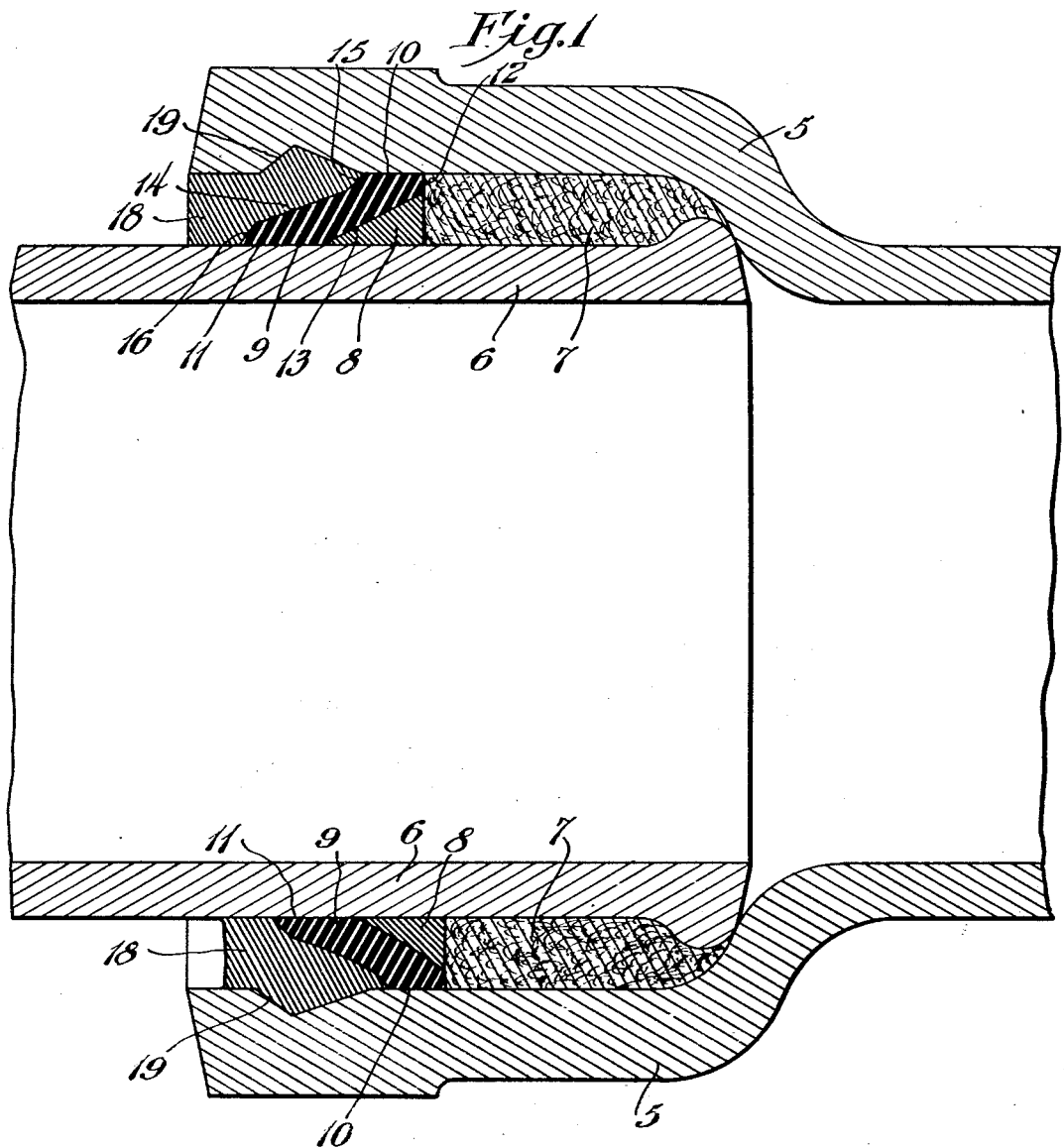
Fig. 1 is a diametric section through a bell and spigot pipe joint, showing at the top the joint materials assembled and partly calked, and at the bottom showing the completely calked joint.
Figure 2:
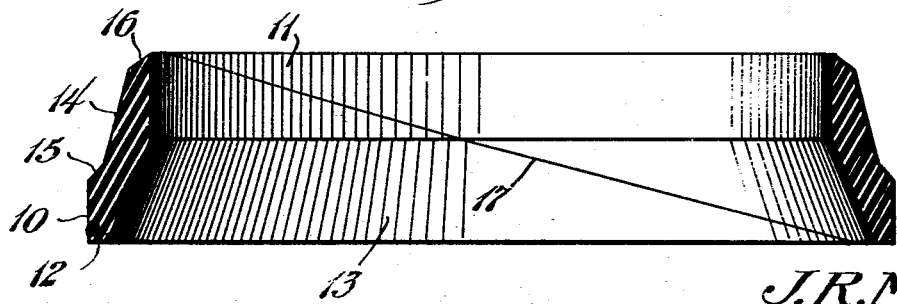
Fig. 2 is a sectional elevation of the rubber gasket or packing ring which is one of the elements of the joint.

In my copending application Serial No. 480,781 filed September 9, 1930, allowed April 12, 1932, I have described and claimed a pipe joint employing a novel rubber gasket or packing ring, the periphery of which at its inner end contacts with the bell and the inner surface of which at its outer end contacts with the spigot, when subjected to calking pressure. This gasket was designed for use in a "pre-calked" or factory made joint, the joint materials being assembled at the factory between a vertical mandrel and bell. It would be distinctly advantageous if the same gasket could be used in making a pipe joint in the field, and in repairing old, leaky joints. But certain difficulties arise to prevent the employment of the same gasket. Where the joint materials are put in a bell in the bottom of the ditch, it is impossible to maintain uniform spacing between the spigot and the bell at all times. Frequently there is a slight deflection in a pipe line, which throws one side of the spigot close against the bell, and draws the opposite side away from the bell. Sometimes pipe lines are deliberately curved, in which case the deflection may be excessive. It would not be possible to use the gasket of my pending application in such instances, because there is insufficient room in a deflected joint, and this makes its use impractical, as the joint maker in the field has no facilities for manufacturing special articles and must be able to turn to materials at hand with the assurance that they are usable under all conditions.

To adapt the gasket to the conditions found in the field, the gasket has been considerably changed so that while the overall thickness of the gasket is the same, a considerable lateral flexure or collapsing is permitted, making it possible to introduce the gasket into a very small space (in repair work) and making possible the insertion of the spigot into the bell when disalined therewith (as in joint making in the field). At the same time, the sealing qualities of the gasket are in no way diminished.

Referring particularly to the drawing, there is shown a bell 5 and spigot 6 which are standard for gas lines. In the joint room at the bottom of the bell is placed a quantity of jute 7, preferably initially in the form of rope rings which are placed around the spigot and rammed home after the spigot is thrust in the bell. In a repair job, the jute is wrapped around the spigot which is already in the bell, and then rammed into the bottom of the bell.

After the jute is in position, a lead ring 8 is thrust into the joint room, said ring being continuous in the case of field-made joints and having a cut in the case of repair work, to permit it to be slipped over the spigot. The separated ends are then brought together and tied as by a copper wire (not shown) which may be mashed down into the lead so as not to project inwardly or outwardly to interfere with or catch on anything. The lead ring 8 is right triangular in cross-section, with the apex or point toward the mouth of the bell and an inclined surface which faces outwardly and provides effectively an inclined plane for tightening the rubber packing ring 9 when the latter is thrust inwardly.

The rubber packing ring 9 has an outside substantially cylindrical surface 10 and an inner substantially cylindrical surface 11, for sealing contact with the bell and spigot, respectively. The overall thickness of the ring, that is the distance between the cylindrical surfaces, may be $\frac{7}{16}$ of an inch, for a four inch pipe, so as to fit the space between the bell and spigot of pipe of that size. In order to impart considerable flexibility to the ring, making it radially compressible, the two cylindrical surfaces 10, 11 are not opposite each other, as in the construction of the pending application, but are spaced longitudinally a distance of about ¼ in. or $\frac{5}{16}$ in. The rubber ring also has a square end 12, as shown, or a rounded end, abutting the mass of jute, an inner surface 13 for contact with the inclined surface of the lead ring, an outer inclined surface 14, and a sloping shoulder 15 and nose 16. Instead of a sloping shoulder, a square shoulder may be used. To permit slipping the rubber ring over the spigot when doing repair work, it is cut on a bias, as shown at 17.

After the rubber ring is in position, lead 18 is poured in or lead wool, cement or other packing material is packed in to lock the joint materials, the lead filling the usual groove 19 near the mouth of the bell, and thus holding its position. The parts then appear as shown at the top of Fig. 1. Calking now takes place, and as the lead 18 is thrust inwardly, the rubber ring is compressed radially and longitudinally. The inclined surface on the lead ring 8 thrusts the cylindrical surface 10 against the bell, while the inclined surface 14 causes the cylindrical surface 11 to be thrust against the spigot. Longitudinal compression of the rubber ring transmits compression through the lead ring to the jute, which is further compacted. Also the lead ring moves toward the bottom of the joint. The final positions and forms of the several elements of the joint are approximately as shown at the bottom of Fig. 1.

The bias cut 17 of the rubber ring makes a perfect seal, because of the large area of the meeting surfaces, and the compression of the ring longitudinally.

The pipe joint illustrated in Fig. 1 has the spigot perfectly centered in the bell. In the field, this perfect centering seldom is encountered. If a rubber ring of the type shown in my pending application were placed on a spigot and the spigot then thrust in the bell a little off center, the spigot may not be thrust all the way in the bell, because of interference by the rubber ring. If the same ring were used in a repair job, with the pipe sections deflected, it might be impossible to force the ring into the narrow space on one side of the bell, due to the deflection. But with the highly flexible, laterally collapsible ring of my invention, it is possible to pack a joint securely under all conditions; the rubber ring being sufficiently flexible to become effectively and materially thinner under lateral compressive forces, thus fitting into joints which are wide on one side (or at the top or bottom), and narrow on the other.

Obviously, the present invention is not restricted to the particular embodiment thereof herein shown and described.

What I claim is:—

1. A rubber packing ring having an inner cylindrical surface at one end and an outer cylindrical surface at the other end, said surfaces being spaced apart transversely of the ring so that no part of the inner cylindrical surface is opposite any part of the outer cylindrical surface; the ring being relatively thin and flexible so as to be collapsible radially to assume a form which is materially narrower than the normal overall width of the ring.

2. A rubber packing ring having an inner cylindrical surface at one end and an outer cylindrical surface at the other end, said surfaces being spaced apart transversely of the ring; the ring being relatively thin and flexible so as to be collapsible or compressible radially to assume a form of materially less overall thickness than the normal overall thickness of the ring; the ring having a bias cut, the angle of which is very acute, so that the two opposed faces formed by said cut are of relatively large area.

3. A bell and spigot pipe joint comprising, in combination, packing material at the bottom of the bell surrounding and in contact with the spigot; a metallic ring surrounding the spigot and adjacent to the packing material, said metallic ring having an inclined or frusto-conical face presented outwardly; a rubber packing ring having an inner frusto-conical face in contact with the metallic ring and having a cylindrical face at its inner end in contact with the bell and a cylindrical face at its outer end in contact with the spigot, the two cylindrical faces being spaced apart transversely of the packing ring, which is relatively thin and flexible in its intermediate portion; and means outside the rubber ring to hold the joint materials against outward movement.

JAMES R. McWANE.